United States Patent [19]
Reasoner et al.

[11] Patent Number: 5,165,894
[45] Date of Patent: Nov. 24, 1992

[54] EDUCATIONAL BOOK SET AND RECEPTACLE

[75] Inventors: Charles E. Reasoner, Woodinville; Victor J. Warren, Seattle, both of Wash.

[73] Assignee: McClanahan Book Company, Inc., New York, N.Y.

[21] Appl. No.: 597,178

[22] Filed: Oct. 15, 1990

[51] Int. Cl.$^5$ .................... G09P 19/00; A63H 00/00; B24D 1/00
[52] U.S. Cl. .................... 434/345; 446/71
[58] Field of Search ............... 434/172, 345, 170, 156, 434/167, 178, 81, 159, 161, 176, 130, 133, 137, 147, 150; 446/147, 71; 281/15.1; 206/232, 424, 472–475, 563

[56] References Cited

U.S. PATENT DOCUMENTS

| | | | |
|---|---|---|---|
| 2,652,635 | 9/1953 | Conger | 434/345 |
| 2,723,465 | 11/1955 | Silverstein | 434/159 |
| 2,839,843 | 6/1958 | Keyko | 434/193 |
| 2,946,137 | 7/1960 | Worth et al. | 446/147 X |
| 4,487,585 | 12/1984 | Goldwasser | 434/259 |
| 4,597,743 | 7/1986 | Becker et al. | 446/147 X |
| 4,819,963 | 4/1989 | Wolski | 281/15.1 |
| 4,909,542 | 3/1990 | Macks | 281/15.1 |

Primary Examiner—Richard J. Apley
Assistant Examiner—Glenn E. Richman
Attorney, Agent, or Firm—Rogers & Killeen

[57] ABSTRACT

An educational device for teaching new readers to recognize characters (e.g., letters, numbers or words) may include a set of books, each having a single theme, and a tray having recesses for holding the books. Each book, and the corresponding recess in the tray, may have a shape related to the particular character that is its theme. By way of example, the set of books may include one book for each letter of the alphabet, one book for each number from one to ten or one book for each of various words that may form a sentence. The tray may take various shapes, including planar and hemispheric, with the recesses in an upward facing surface.

25 Claims, 3 Drawing Sheets

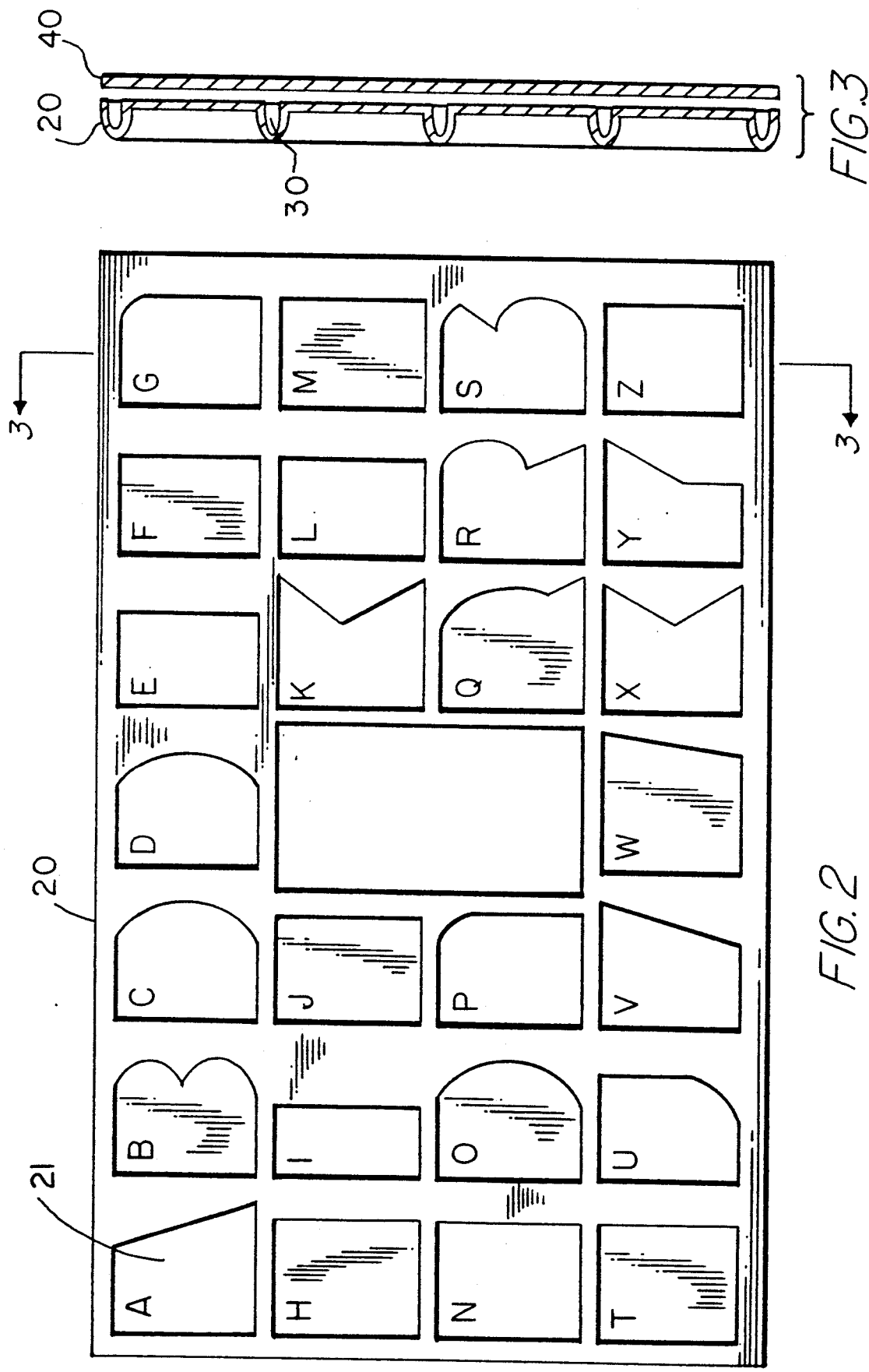

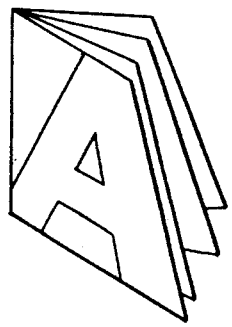
FIG.6
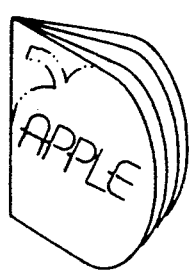
FIG.8
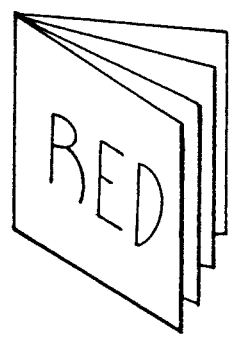
FIG.9
FIG.4
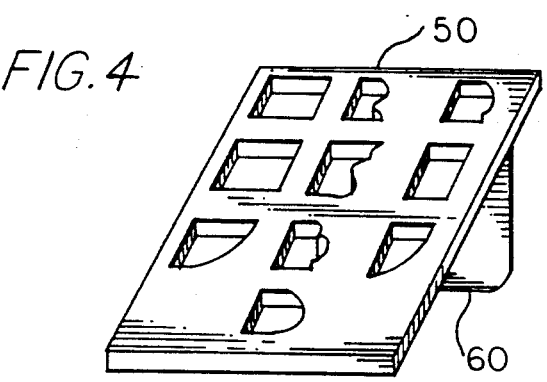
FIG.7
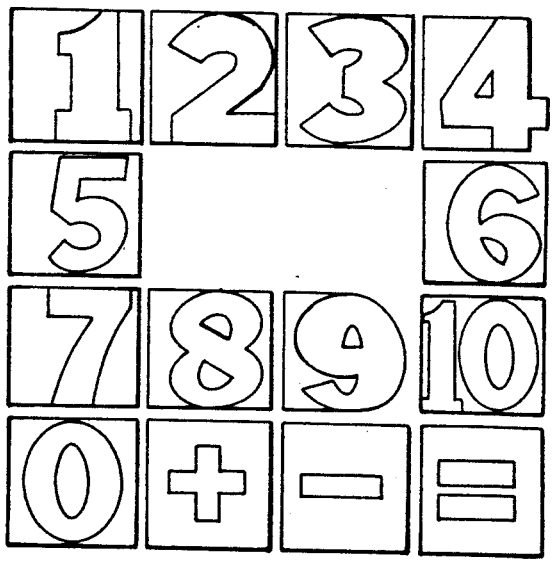
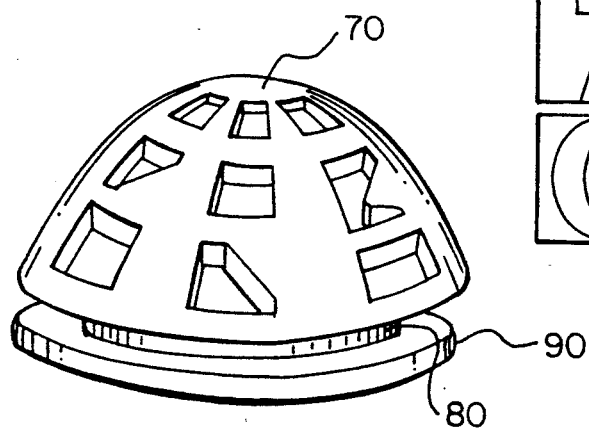
FIG.5

EDUCATIONAL BOOK SET AND RECEPTACLE

BACKGROUND OF THE INVENTION

The relates to educational devices for teaching new readers to recognize characters. More specifically, the present invention relates to a set of single-theme books and a tray having recesses for holding the books.

As used herein, the term "character(s)" refers to letters of the alphabet, numbers and words. The term "book" refers to a group of bound pages, a pamphlet or any similar arrangement of multiple sheets of suitable material such as paper, fabric and the like. The term "theme" refers to the primary subject matter of the book whether set forth in text or pictures. The term "shape(s)" refers to the peripheral outline.

The new reader may have less difficulty learning to read when the characters that must be learned are presented in a format that is enjoyable for the new reader. Young children who are not otherwise motivated to learn have less difficulty when the child perceives the learning experience as a game rather than an obstacle. The present invention provides a novel educational device for teaching new readers to recognize characters that incorporates a set of books, each book having a single theme, in a puzzle format that may be perceived as a game. The shape of each book in the set may relate to the theme of the book. For example, a book related to the letter "A" may take, in part, the shape of the letter "A"; a book related to the word "apple" may take the shape of an apple. The device includes a tray having recesses with shapes corresponding to the shapes of the various books. For example, the tray may have ten recesses, one for each book of a set related to the numbers one through ten.

In use, a teacher may remove all of the books from a tray and encourage the new reader to replace each book in its appropriate recess and to peruse each book before replacing it. By so doing, the child enjoys the puzzle aspect of the device and becomes familiar with the characters in the books.

Various types of educational devices for new readers are known in the art. For example, blocks in the shapes of letters may be placed in recesses in a board. The blocks may also take the shape of a letter that relates to a word and/or picture on the block. Such blocks, however, convey no more information than what can be seen on their exterior surfaces and information is generally limited to the uppermost surface. See, for example, U.S. Pat. No. 1,864,703 to West, U.S. Pat. No. 3,280,499 to Studen and U.S. Pat. No. 3,491,196 to Stein.

Books may provide more surface area for conveying information and can convey the same amount of information as blocks in a smaller space. Further, the use of books in an enjoyable puzzle format associates books with fun and thus encourages the new reader to read more. Children can enjoy "reading" each book in the set to copy the behavior of their parents. The present device can also be transported more easily than blocks.

Accordingly, it is an object of the present invention to provide a novel educational device for teaching new readers to recognize characters that places a set of books, each related to one of the characters, in a puzzle format.

It is a further object of the present invention to provide a novel educational device having a tray with specifically shaped recesses for holding correspondingly shaped books, wherein the shape of each of the recesses and its corresponding book relate to the theme of the book.

It is another object of the present invention to provide a novel educational device having a set of twenty-six books, each having a theme relating to a different letter of the alphabet, and a tray with recesses for holding the books.

It is yet a further object of the present invention to provide a novel educational device having a set of at least ten books, each having a theme related to a different number, and a tray with recesses for holding the books.

It is still a further object of the present invention to provide a novel book storage tray with a plurality of differently configured recesses each shaped to relate to the content of the book stored therein.

These and many other objects and advantages will be readily apparent to one skilled in the art to which the invention pertains from a perusal of the claims, the appended drawings, and the following detailed description of preferred embodiments.

DESCRIPTION OF THE DRAWINGS

FIG. 2 is a top plan view of a tray of the type that may be used in the present invention.

FIG. 3 is a cross-sectional view through lines 3—3 of the tray of FIG. 2.

FIG. 4 is a pictorial representation of an alternative embodiment of the tray of the present invention.

FIG. 5 is a pictorial representation of a further embodiment of the tray of the present invention.

FIG. 6 is a pictorial representation of a book whose theme relates to a letter of the alphabet.

FIG. 7 is a pictorial representation of a set of books related to numbers.

FIG. 8 is a pictorial representation of a book whose theme relates to a word.

FIG. 9 is a pictorial representation of a book whose theme relates to a color.

DESCRIPTION OF PREFERRED EMBODIMENTS

Figure 1:
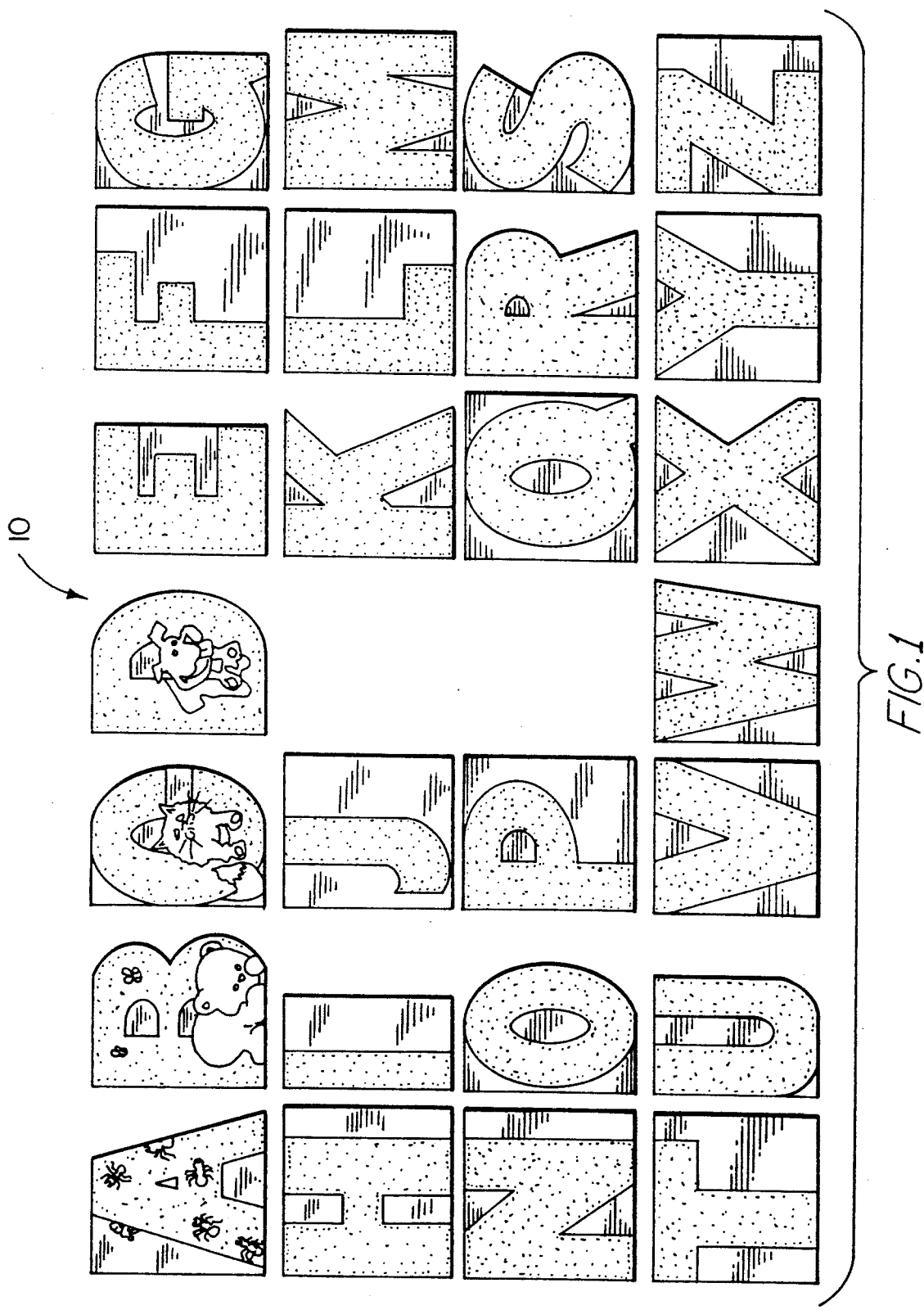
FIG. 1 is a pictorial representation of a set of books related to the letters of the alphabet.

With reference now to the figures and with particular reference to FIGS. 1 and 2, the present invention may include a set of books 10 and a tray 20 for holding the books. Each book in the set of books 10 may be directed to a single theme related to a particular character. The shape of each book may relate to the character that is the theme of the book. For example, a set of twenty-six books 10 each related to a letter of the alphabet may include a book whose theme is the letter "A". The book may include pictures and/or text related to items beginning with the letter "A". Further, the book may take the shape of the letter "A" as shown in FIG. 6. The tray 20 may include a recess 21 shaped to conform to the book so that a young reader may place the book related to the letter "A" therein.

With reference now to FIG. 3, the tray 20 may be formed from molded plastic. Appropriate conventional supporting structure 30, such as ribs, may be added to the spaces between the recesses. Further support may be added by a brace 40 affixed to the back of the tray 20 with any suitable means, such as glue. The tray may also be formed from a solid piece of suitable material such as wood or styrofoam.

The tray 20 may be formed in any suitable shape although in the preferred embodiment the tray is generally planar. However, and as shown in FIG. 4, a planar tray 50 may include a stand 60 for holding the tray in a canted position so that it may be more easily used, and in an alternative embodiment of FIG. 5, the tray 70 may be non-planar (e.g., hemispheric, pyramid-shaped or the like) and may include means 80, such as a conventional turntable, for rotating the tray 70 on a supporting stand 90.

With reference now to FIGS. 6 through 9, each book in the set of books may relate to a single theme such as a letter (FIG. 6), a number (FIG. 7) or words (FIGS. 8 and 9) that may be used to form a sentence. The theme of each book may relate to a particular color with the word for that color and the color itself on the cover of the book. The pages of the book may portray articles of that color.

In the preferred embodiment each book may have a relatively small number of pages, typically five to ten (preferably eight), and be approximately two to three inches in height and width. In the embodiment of FIGS. 1 and 2, twenty-six two inch square books may be placed in a tray approximately sixteen inches by ten inches by one-quarter inch. On such scale, the set of books shown in FIG. 7 may be placed in a tray about ten inches square.

While preferred embodiments of the present invention have been described, it is to be understood that the embodiments described are illustrative only and that the scope of the invention is to be defined solely by the appended claims when accorded a full range and equivalence, many variations and modifications naturally occurring to those skilled in the art from a perusal hereof.

I claim:

1. An educational device for teaching new readers to recognize certain characters, the device comprising:
   (a) a tray having a first plurality of recesses in an upwardly facing surface; and
   (b) a first plurality of books related to a general topic inclusive of certain characters, each of said plurality of books having a shape corresponding to the shape of at least one of said recesses so that each of said books may be positioned in at least one of said recesses,
   each of said books having a theme that is associated with one of the characters within the general topic so that new readers may more easily learn to recognize the characters.

2. The device as defined in claim 1 wherein each of said recesses has a shape generally corresponding to a different one of the characters.

3. The device as defined in claim 2 wherein the shape of each of said books relates to the theme thereof.

4. The device as defined in claim 1 wherein there are at least twenty-six said recesses and the characters comprise letters.

5. The device as defined in claim 1 wherein there are at least ten said recesses and the characters comprise numbers.

6. The device as defined in claim 1 wherein the characters comprise words.

7. The device as defined in claim 6 wherein the words define colors and each of said books related to the defined color.

8. The device as defined in claim 1 wherein said tray is generally planar.

9. The device as defined in claim 1 wherein said tray is not planar.

10. The device as defined in claim 9 wherein said tray is hemispheric.

11. The device as defined in claim 10 further comprising a stand for holding said tray and means for rotating said tray on said stand.

12. An educational device comprising:
   (a) a plurality of books, each of said plurality of books (i) being related to the same general topic, (ii) having a substantially uniform thickness and (iii) having a shape generally corresponding to a theme within the general topic; and
   (b) a book support means having a generally upwardly facing surface with a recess therein for each of said plurality of books, each said recess having a shape generally corresponding to the shape of the book to be supported thereby so that each of said plurality of books is adapted for support by said book support means in a specific recess.

13. The educational device as defined in claim 12 wherein the general topic of said plurality of books is the alphabet; and
   wherein the theme of each of said plurality of books is a letter of the alphabet.

14. The educational device as defined in claim 12 wherein the general topic of said plurality of books is numerals, and
   wherein the theme of each of said plurality of books is a specific numeral.

15. The educational device as defined in claim 14 wherein the general topic of said plurality of books is single digit numerals, and
   wherein the theme of each of said plurality of books is a specific single digit numeral.

16. The educational device as defined in claim 12 wherein the general topic of said plurality of books is color, and
   wherein the theme of each of said plurality of books is a specific color.

17. The educational device as defined in claim 12 wherein the general topic of said plurality of books is a sentence, and
   wherein the theme of each of said plurality of books is a single word within the sentence.

18. The educational device as defined in claim 17 wherein the word themes of said plurality of books may be combined to form a sentence.

19. The educational device as defined in claim 12 wherein each of said plurality of books is has less than ten pages.

20. The educational device as defined in claim 12 wherein each of said plurality of books is between about two and three inches in height and width.

21. The educational device as defined in claim 12 wherein said book support means has a generally flat upper surface and is approximately ten inches square.

22. The educational device as defined in claim 12 wherein said book support means has a generally flat upper surface and is approximately ten inches by sixteen inches.

23. The educational device as defined in claim 12 wherein each recess in said book support means is approximately one quarter inch deep.

24. The educational device as defined in claim 12 wherein said book support means has a generally flat upper surface and is devoid of a book supporting recess in a central area thereof.

25. An educational device comprising:
(a) a plurality of books, each of said plurality of books (i) being related to the same general topic, (ii) having a substantially uniform thickness and (iii) having a shape generally related to a theme within the general topic, (iv) having no more than about ten pages and (v) being between about two and about three inches in both height and width; and (b) a book support means having a generally flat upwardly facing surface with a generally flat central area and a plurality of recesses approximately one-quarter inch deep around said central area, each of said plurality of recesses having a shape generally corresponding to the shape of the book to be supported thereby so that each of said plurality of books is adapted for support by said book support means in a specific recess.

* * * * *